(12) United States Patent
Windeshausen

(10) Patent No.: US 12,043,009 B2
(45) Date of Patent: Jul. 23, 2024

(54) MOLD SEGMENT AND SEGMENTED TIRE MOLD WITH FLUID-PERMEABLE INFILL

(71) Applicant: The Goodyear Tire & Rubber Company, Akron, OH (US)

(72) Inventor: Michel Jean Yves Windeshausen, Messancy (BE)

(73) Assignee: THE GOODYEAR TIRE & RUBBER COMPANY, Akron, OH (US)

(*) Notice: Subject to any disclaimer, the term of this patent is extended or adjusted under 35 U.S.C. 154(b) by 0 days.

(21) Appl. No.: 17/808,822

(22) Filed: Jun. 24, 2022

(65) Prior Publication Data

US 2023/0061660 A1    Mar. 2, 2023

Related U.S. Application Data

(60) Provisional application No. 63/237,353, filed on Aug. 26, 2021.

(51) Int. Cl.
*B29D 30/06* (2006.01)
*B33Y 80/00* (2015.01)

(52) U.S. Cl.
CPC .. B29D 30/0629 (2013.01); *B29D 2030/0612* (2013.01); *B29D 2030/0613* (2013.01); *B29D 2030/0614* (2013.01); *B29D 2030/0617* (2013.01); *B29K 2905/12* (2013.01); *B29K 2995/0097* (2013.01); *B33Y 80/00* (2014.12)

(58) Field of Classification Search
CPC ......... B29D 30/0629; B29D 2030/0612–0614; B29D 2030/0617; B33Y 80/00
USPC ..................................................... 425/28.1
See application file for complete search history.

(56) References Cited

U.S. PATENT DOCUMENTS

| 7,540,730 B1 | 6/2009 | Ouvahia et al. |
| 9,085,114 B2 | 7/2015 | Gaebelein et al. |
| 9,409,233 B2 | 8/2016 | Bonnet |

(Continued)

FOREIGN PATENT DOCUMENTS

| DE | 4341683 A1 | 6/1995 |
| DE | 19929333 C1 | 12/2000 |

(Continued)

OTHER PUBLICATIONS

DR David Whittaker, Metal Additive Manufacturing, The Magazine for the Metal Additive Manufacturing Industry, Autumn/Fall 2018, Industry News, vol. 4, No. 3, Inovar Communications Ltd, https://drive.google.com/file/d/1Ar1ETAQCkPx5zvm3qFbV4aZvnISJ4SKv/view.

(Continued)

*Primary Examiner* — Jeffrey M Wollschlager
*Assistant Examiner* — Xue H Liu
(74) *Attorney, Agent, or Firm* — Katherine A. Smith

(57) ABSTRACT

The subject invention relates to a mold segment comprising a tread molding element for manufacturing a tire wherein the tread molding element comprises a shell and an infill, wherein the shell has a first wall with a negative tread pattern extending from its external surface for molding the tread, a second wall opposed to the first wall, and lateral walls; wherein the infill is a fluid-permeable structure defining a fluid-permeable infill; and wherein at least one of a lateral wall and the second wall comprises at least one fluid passage passing through the lateral wall or the second wall.

16 Claims, 2 Drawing Sheets

(56) References Cited

U.S. PATENT DOCUMENTS

| | | |
|---|---|---|
| 10,377,058 B2 | 8/2019 | Hiraki |
| 10,583,481 B2 | 3/2020 | Blanchet |
| 2007/0148270 A1 | 6/2007 | Jung et al. |
| 2009/0162465 A1 | 6/2009 | Komornik et al. |
| 2014/0265033 A1 | 9/2014 | Woloszyn et al. |
| 2017/0106614 A1 | 4/2017 | Hiraki |
| 2017/0333991 A1 | 11/2017 | Kanai |
| 2018/0297305 A1 | 10/2018 | Calvel et al. |
| 2020/0324497 A1 | 10/2020 | Tardiff et al. |

FOREIGN PATENT DOCUMENTS

| | | | |
|---|---|---|---|
| DE | 102004028462 A1 | 12/2005 | |
| EP | 3659791 A1 * | 6/2020 | ............. B22F 10/20 |
| EP | 3659791 A1 | 6/2020 | |
| WO | 2018222475 A1 | 12/2018 | |

OTHER PUBLICATIONS

Li Yuan et al., Additive manufacturing technology for porous metal implant applications and triple minimal surface structures: A review, Bioactive Materials 4, 2019, pp. 56-70, Ke Ai Advancing Research Evolving Science.

Extended European Search Report for Application No. 22191687.7, dated Jan. 11, 2023.

\* cited by examiner

MOLD SEGMENT AND SEGMENTED TIRE MOLD WITH FLUID-PERMEABLE INFILL

TECHNICAL FIELD

The present disclosure relates to mold segments and tire molds for manufacturing a pneumatic or non-pneumatic tire. The present disclosure is reveals a process to produce such a tire mold by additive manufacturing.

TECHNICAL BACKGROUND

Tire molds for molding pneumatic or non-pneumatic tires are made of steel or aluminum, and are heated by steam platens or by placing the molds in pot-heaters. Thermal conduction is usually relied upon to transfer the heat from the heat source to the tread and sidewall forming surfaces. It is desirable to maximize the heat conduction to the tread and sidewall forming surfaces. If the thermal conduction is less than optimum, it will require additional cure time and energy costs resulting in reduced production capacity for the mold and higher operating costs. Inefficient thermal conduction can also result in temperature non-uniformity in the mold. The time to cure a tire is limited by the point of least cure on the tire, which is typically located on the under-tread or in the bead area. Thus, if this area could be cured quicker, the entire time needed to complete the curing process could be reduced.

U.S. Pat. No. 7,540,730 has provided a solution to this problem by bringing the heat source nearest to the segments. The document discloses a segmented mold comprising a plurality of segments arranged to form an annular cavity to mold a tire, the segments comprising a first wall for molding the tread, and an outer radial surface; the mold further comprising a plurality of slide blocks located radially outwards of the segments; wherein one or more channels are provided between each segment outer surface and the adjacent slide block inner surface forming a fluid passageway, wherein each fluid passageway is joined together by a fluid connector to form a fluid manifold for circulating a fluid medium. This configuration provides the heat source to the tread segments.

However, there continues to be a long felt need for further improvements in tire molds. More specifically, an improved mold which can heat an uncured tire more quickly, uniformly, and efficiently would be highly beneficial.

SUMMARY OF THE INVENTION

One or more of the above needs can be fulfilled by the present disclosure wherein a tread molding element is produced by additive manufacturing and comprising a shell and an infill, wherein the infill has a 3D structure that is fluidly permeable; i.e., that is permeable to gas, steam and/or liquids. As a consequence, the heating fluid can pass inside the mold segment rather than outside of it and can get in closer proximity to the surface in contact with the tire, such as the tire tread. The mold segment has at least a shell for housing introduced steam or cooling water therein. The shell can be relatively thin to maximize the level of heat conductivity; for example it is at most 15 mm thick or even can be much thinner. The printed mold material can be either a plastic polymer material or metallic material such as stainless steel or aluminum. An important advantage associated with using such a mold segment is its ability to quickly deliver heat to the surface of the uncured tire to facilitate curing more rapidly than can be achieved using heavy, cast metal segments. Also, cooling can be applied more rapidly and uniformly in cases where quick temperature adjustments are necessary. The mold segment has one or more openings for receiving cooling water, steam, or gas. The mold segment of this invention also offers the advantage of reduced weight and the resulting savings associated with the reduced cost of materials used in manufacturing the mold segment.

Another advantage is that the surface of the tire to be molded can be vented more easily. In particular, air/gas has to be removed from the mold during or before curing through the mold segment. Historically, bores or other venting devices are provided through the surface of the mold segment facing the tire surface such that air can escape during molding through the mold away from the rubber material. In an embodiment, venting means such as channels or slots can be either made directly by additive manufacturing (i.e., 3D printed) into the thin shell facing the tire, e.g. using the cavity formed by the shell for receiving the vented air from the tire surface. Optionally, a vacuum can be applied via the segment cavity to the thin wall having venting openings towards the tire. Alternatively venting openings, such as slots or holes, can also be laser cut into the shell facing the tire. Such slots or openings have typically widths ranging from 10 µm to 500 µm, preferably from 20 µm to 100 µm. The depth of such channels could correspond to the thickness of the shell which may be in the range of multiple millimeters.

In some embodiments, the present disclosure provides for mold segments for the manufacture of a tire which comprises a shell and a fluid permeable infill that allows the circulation of fluid within the mold segments, tire molds comprising at least one mold segment with a fluid permeable infill, processes to produce such mold segments, and methods to manufacture a tire using such mold segments.

In some embodiments, the present disclosure provides for a tire mold segment and operation related to the tire curing mold segment. The present disclosure provides for a process for making a tire wherein the heating fluid is brought inside one or more mold segments.

Thus, according to a first aspect, the disclosure is directed to a mold segment comprising a tread molding element for the manufacture of a tire wherein the tread molding element comprises a shell and an infill; the shell having a first wall with a negative tread pattern extending from its external surface for molding the tread, a second wall opposed to the first wall, (preferably two) lateral walls, and optionally one or two transverse edge walls; wherein the infill is a fluid-permeable structure defining a fluid-permeable infill; and wherein at least one selected from a lateral wall and the second wall comprises at least one fluid passage, optionally selected from an inlet port, an outlet port and any combination thereof; and wherein the at least one fluid passage passes through the lateral wall or the second wall and is optionally open (or in other words in fluidly connected) to the fluid permeable infill.

According to a second aspect, the disclosure provides for a mold segment comprising a tread molding element for the manufacture of a tire, wherein the tread molding element comprises a shell and an infill; wherein the shell has a first wall with a negative tread pattern extending from its external surface for molding the tread, a second wall opposed to the first wall, (preferably two) lateral walls and optionally one or two transverse edge walls; wherein the infill is a fluid-permeable structure defining a fluid permeable infill; wherein the shell is integral (or in other words integrally formed) with the fluid-permeable structure; wherein the first wall comprises one or more vents which are optionally selected from micro-holes, micro venting channels, slots and any combination thereof and wherein the one or more vents pass through the first wall and are open (or in other words fluidly connected) to the fluid permeable infill; and wherein at least one selected from a lateral wall and the second wall comprises at least one fluid passage, optionally selected from an inlet port, an outlet port and any combination thereof, wherein the at least one fluid passage is passing through the lateral wall or through the second wall and is open (or in other words fluidly connected) to the fluid permeable infill.

Additional options for further defining the mold segment according to the first aspect or the second aspect are provided herein below.

In some embodiments, the mold segment comprises a tread molding element and a support element; or a tread molding element integral with the support element; or a tread molding element, a support element and a slide block and wherein the tread molding element is integral with the support element and with the slide block so that the second wall of the mold segment has an outer angled surface.

For example, the fluid-permeable structure is selected from a fluid-permeable lattice structure, a bionic structure or a bionic structure that is formed by a lattice structure. For example, the fluid-permeable structure is selected from a bionic structure or a bionic structure that is formed by a lattice structure wherein the bionic structure comprises one or more arched parts, one or more tree-form parts and any mixture thereof.

For example, the first wall has a thickness ranging from 1.0 mm to 15.0 mm; preferably from 1.5 mm to 10.0 mm; more preferably from 2.0 mm to 8.0 mm, and most preferably from 2.5 mm to 6.0 mm.

For example, the negative tread pattern comprises reliefs selected from one or more sipes, one or more blades and any combination thereof wherein the one or more reliefs are integral with the first wall. For example, at least one blade is hollow and opened on the internal surface of the first wall. This configuration allows for bringing the heating fluid inside the grooves of the tire.

In an embodiment, the first wall has one or more vents forming one or more fluid passages which are selected from micro-holes, micro venting channels, slots, and any combination thereof. With preference, the one or more vents pass through the first wall and are open to the infill with a fluid-permeable structure or to a fluid conduit formed into the infill. For example, the one or more vents have a width ranging from 10 µm to 500 µm; preferably from 15 µm to 100 µm; and more preferably from 20 t µm to 50 µm.

The mold segment comprises two transverse edges wherein one or both of the transverse edges are devoid of a transverse edge wall or have a transverse edge wall (i.e. transverse edge wall without any opening to the infill) or have a transverse edge wall with one or more openings. The absence of a transverse edge wall or the presence of a transverse edge wall with one or more openings allows for the creation of a fluid connection of the infill of two adjacent mold segments in a tire mold being in a closed configuration.

For example, the mold segment comprises two transverse edges with transverse edge walls and one or both of the transverse edge walls have one or more openings to form a fluid passage intended for the fluid connection of the infill of said mold segment with the infill of another mold segment which is placed adjacently in a tire mold being in a closed configuration.

In another example, the mold segment comprises two transverse edges and is devoid of at least one transverse edge wall, preferably the mold segment comprises two transverse edges and is devoid of transverse edge walls. In such a configuration the transverse edge is open for the infill to form a fluid passage intended for the fluid connection of the infill of said mold segment with the infill of another mold segment which is placed adjacently in a tire mold being in a closed configuration.

In one embodiment, the shell encompasses or houses the infill, and/or is integrally formed with the infill, e.g. by an additive manufacturing process. In particular, in such an embodiment, in which the infill is integrally formed with the shell it can allow for a very thin shell thicknesses. For instance, the thickness of the shell may range from 0.3 mm to 15.0 mm, from 1.0 mm to 12.0 mm, from 2.0 mm to 10.0 mm, or from 3.0 mm to 8.0 mm. In another embodiment, at least one wall of the mold segment, including at least the first wall, has a thickness falling within one of these ranges.

In a preferred embodiment, the mold segment is produced by an additive manufacturing process and is made from a material selected from one or more metallic materials or one or more plastic compositions comprising one or more thermoplastic polymers having a melting point of at least 180° C. as determined according to ISO 3146.

When the material is one or more metallic materials, it can be selected from aluminum and stainless steel. For example, the process of additive manufacturing is selected from Fused Deposition Modeling (FDM), Selective Laser Sintering (SLS), Selective Laser Melting (SLM) or Electron Beam Melting (EBM); with preference, the process is Selective Laser Melting (SLM).

When the material is one or more metallic materials, the tread molding element may be a full sintered element or may comprise a sintered part and a non-sintered part attached to this sintered part and wherein the non-sintered part is the second wall. With preference, the tread molding element comprises a sintered part and a non-sintered part attached to this sintered part, wherein the non-sintered part is the second wall and is drilled to form at least one fluid passage selected from an inlet port, an outlet port and any combination thereof, wherein the at least one fluid passage is passing through the second wall and is opened to the fluid permeable infill.

When the material is one or more metallic materials, the first wall may be a porous structure.

When the material is one or more plastic compositions comprising one or more thermoplastic polymers having a melting point of at least 180° C. as determined according to ISO 3146, the one or more thermoplastic polymers are selected from one or more polyamides, one or more polyether ether ketones (PEEK), and one or more polyetherimides (PEI). In some embodiments of this invention, the thermoplastic polymers have a melting point of at least 180° C., as determined according to ISO 3146:2000, of at least 185° C.; at least 190° C.; at least 205° C.; at least 220° C.; at least 230° C.; or at least 240° C.

For example, the one or more thermoplastic polymers can be comprised of one or more polyamides. Some representative examples of polyamides that can be used include, but are not limited to. Nylon-6; Nylon-6,6; Nylon-6,9; Nylon-6,10; Nylon-6,12; Nylon-11; Nylon-4,6 and Nylon-66/6 copolymer. With preference, the one or more polyamides are or comprise Nylon-66/6 copolymer.

According to a third aspect, a segmented tire mold is divided in a tire circumferential direction into a plurality of mold segments each having a first and a second transverse edge and being movable in a respective operation direction between an open position wherein the mold segments are spaced from each other and a closed position wherein two neighboring mold segments are in contact with each other by one of their transverse edges, and wherein at least one mold segment is a mold segment according to the first aspect or the second aspect. For example, all of the mold segments of the tire mold are mold segments according to the first aspect or the second aspect.

In an embodiment, at least two mold segments comprising a fluid-permeable infill are in fluid communication with each other. For example, all the mold segments comprising a fluid-permeable infill are in fluid communication with each other.

For example, at least two mold segments comprising a fluid-permeable infill are in fluid communication with each other, wherein each mold segment comprising a fluid-permeable infill further comprises one inlet port and one outlet port and at least two mold segments are in fluid connection by means of a flexible connector that is connecting the outlet port of one mold segment to the inlet port of the other mold segment. For example, the fluid connectors are tubular.

For example, at least two mold segments comprising a fluid-permeable infill are in fluid communication with each other, wherein at least two neighboring mold segments comprising a fluid-permeable infill have one or more openings on their transverse edge walls, wherein the one or more openings are arranged to form a fluid passage through their transverse edge when the mold segments are in the closed position.

In an embodiment, the opening is of the size of the transverse edge wall so that at least two neighboring mold segments comprising a fluid-permeable infill are devoid of at least one transverse edge wall to form a fluid passage through their transverse edge when the mold segments are in the closed position.

In an embodiment, the segmented tire mold further comprises an annular actuating ring with an inner surface, wherein at least one mold segment comprising a fluid-permeable infill has a second wall with an outer angled surface and further wherein the inner surface of the actuating ring directly engages the outer angled surface of the mold segment, causing the mold segment to move from its opened position to its closed position.

According to a fourth aspect, the disclosure provides for a process for manufacturing a mold segment according to the first aspect or to the second aspect, the mold segment comprising a tread molding element configured to mold at least a portion of a tire tread, the process comprising the steps of:
  modeling a three-dimensional shape of a tread molding element through a modeling program;
  providing a printing material selected from one or more metallic materials or one or more plastic compositions comprising one or more thermoplastic polymers having a melting point of at least 180° C. determined according to ISO 3146:2000;
  forming a tread molding element by additive manufacturing from the printing material based on the modelled three-dimensional shape of the tread molding element wherein the tread molding element comprises a shell and an infill, wherein the shell has a first wall with a negative tread pattern extending from its external surface for molding the tread and a second wall opposed to the first wall, two lateral walls and optionally one or two transverse edge walls;
wherein the step of modeling a three-dimensional shape of a tread molding element through a modeling program includes creating a digital model representing a three-dimensional shape of an infill being a fluid-permeable structure; and wherein the process further comprises a step of creating one or more fluid passages on one or more walls forming the shell, wherein the one or more fluid passages are selected from an inlet port and an outlet port and are opened on the fluid-permeable infill.

For example, the one or more walls are different from the first wall and are selected from the second wall, one or more of the lateral walls and one or more of the transverse edge walls; with preference, the one or more walls are the second wall and/or one or more of the transverse edge walls.

In an embodiment, the step of modeling a three-dimensional shape of a tread molding element through a modeling program includes creating a digital model representing a three-dimensional shape of one or more fluid passages on one or more walls forming the shell; wherein the one or more fluid passages are selected from an inlet port and an outlet port and are opened on the fluid-permeable infill. In such embodiment, the one or more fluid passages are created by the additive manufacturing process.

In an embodiment, the step of creating one or more fluid passages on one or more walls forming the shell is performed by cutting the one or more walls to form a fluid passage; for example, the step of creating one or more fluid passages on one or more walls forming the shell is performed using a liquid-jet laser process.

In an embodiment, the step of modeling a three-dimensional shape of a tread molding element through a modeling program includes creating a digital model representing a three-dimensional shape of a molding cavity wherein the molding cavity has a first wall with a porous structure. It is understood that the porous structure allows a fluid such as air to be evacuated during the closing of the mold into the fluid-permeable infill.

In an embodiment, the process comprises a step of creating one or more fluid passages on the first wall being one or more vents and the step of modeling a three-dimensional shape of a tread molding element through a modeling program which includes creating a digital model representing a three-dimensional shape of one or more vents on the inner radial wall selected from micro-holes, micro venting channels, slots and any combination thereof; wherein the one or more vents are connecting the fluid permeable infill. In such embodiment, the one or more vents are created by the additive manufacturing process.

In an embodiment, the process comprises a step of creating one or more fluid passages on the first wall being one or more vents, and said step is performed by cutting the first wall to form one or more vents; for example, the step of creating one or more vents on the first wall is performed using a liquid-jet laser process.

For example, the step of forming a tread molding element by 3D printing from the one or more plastic compositions includes forming a tread molding element that comprises a shell and a fluid permeable infill wherein the infill percentage is ranging from 10 to 80 vol. %, based on the total volume of the internal cavity of the mold segment; for example, from 20 to 70 vol. % or from 30 to 60 vol. % or from 15 to 50 vol. % or from 25 to 40 vol. %.

According to a fifth aspect, the disclosure provides for the use, in a process for manufacturing a pneumatic or a non-pneumatic tire, of a tire mold comprising one or more mold segments comprising a tread molding element for the manufacture of a tire wherein the tread molding element comprises a shell and an infill, wherein the shell has a first wall with a negative tread pattern extending from its external surface for molding the tread and an second wall opposed to the first wall, two lateral walls and optionally one or two transverse edge walls; wherein the infill is a fluid-permeable structure defining a fluid-permeable infill; and wherein at least one selected from a lateral wall or the second wall comprises at least one fluid passage selected from an inlet port, an outlet port and any combination thereof, wherein the at least one fluid passage is passing through the lateral wall or through the second wall and is opened to the fluid-permeable infill; wherein the use comprises passing a heating fluid and/or a cooling fluid within at least one mold segment by means of the one or more fluid passages; i.e., within the fluid-permeable infill of at least one mold segment by means of the one or more fluid passages connecting the exterior of the mold segment to the fluid permeable infill.

According to a sixth aspect, the disclosure provides for a method of manufacturing a tire or a section of a tire; the method comprising providing one or more mold segments according to the first aspect or to the second aspect and molding a tire or a portion of a tire using the one or more mold segments; wherein a heating fluid and/or a cooling fluid is circulating within at least one mold segment.

For example, molding a tire or a portion of a tire using the one or more mold segments comprises providing a green tire or a portion of a green tire and performing vulcanization of the green tire or the portion of a green tire at a temperature of at least 120° C. and for a time of at least 20 minutes in presence of one or more mold segments.

DEFINITIONS

For this disclosure, the following definitions are given.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 includes 1, 2, 3, 4 and 5 when referring to, for example, a number of elements, and can also include 1.5, 2, 2.75 and 3.80, when referring to, for example, measurements). The recitation of endpoints also includes the recited endpoint values themselves (e.g. from 1.0 to 5.0 includes both 1.0 and 5.0). Any numerical range recited herein is intended to include all sub-ranges subsumed therein.

The reference throughout this specification to "one embodiment" or "an embodiment" means that a particular feature, structure or characteristic described in connection with the embodiment is included in at least one embodiment of the present disclosure. The particular features, structures, characteristics or embodiments may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure and form different embodiments, as would be understood by those skilled in the art.

Unless otherwise defined, all terms used in the disclosure, including technical and scientific terms, have the meaning as commonly understood by one skilled in the art to which this disclosure belongs. By means of further guidance, definitions for the terms used in the description are included to better appreciate the teaching of the present disclosure.

"Asymmetric tread" means a tread that has a tread pattern not symmetrical about the center plane or the equatorial plane of the tire.

"Symmetric tread" means a tread that has a tread pattern symmetrical about the center plane or the equatorial plane of the tire.

"Directional Tread Pattern" means a tread pattern designed for a specific direction of rotation.

"Circumferential" means lines or directions extending along the perimeter of the surface of the annular tread perpendicular to the axial direction.

"Axial" means lines or directions that are parallel to the axis of rotation of the tire.

"Sipes" means small slots molded into the tread elements that subdivide the tread surface and improve traction. A sipe is narrower than a groove.

"Green tire" means a tire in an uncured state; i.e., before a step of vulcanization.

In the disclosure, "3D printing", "additive manufacturing" and "three-dimensional printing" are used as synonymous. In the same way, "3D printer" and "three-dimensional printer" are used as synonymous.

BRIEF DESCRIPTION OF THE DRAWINGS

The invention will be described by way of example and with reference to the accompanying drawings in which.

DETAILED DESCRIPTION OF THE INVENTION

The following is an explanation of a process according to the present disclosure for molding a pneumatic or non-pneumatic tire. The process is also suitable for molding a relevant part of a pneumatic or non-pneumatic tire for testing purposes. The present disclosure is also related to the tread molding element used in the said process and to the pneumatic or non-pneumatic tire or to the parts of a pneumatic or non-pneumatic tire produced according to the said process. The pneumatic or non-pneumatic tire or the parts thereof can show either a symmetric tread, or an asymmetric tread, or a directional tread pattern.

Figure 1:
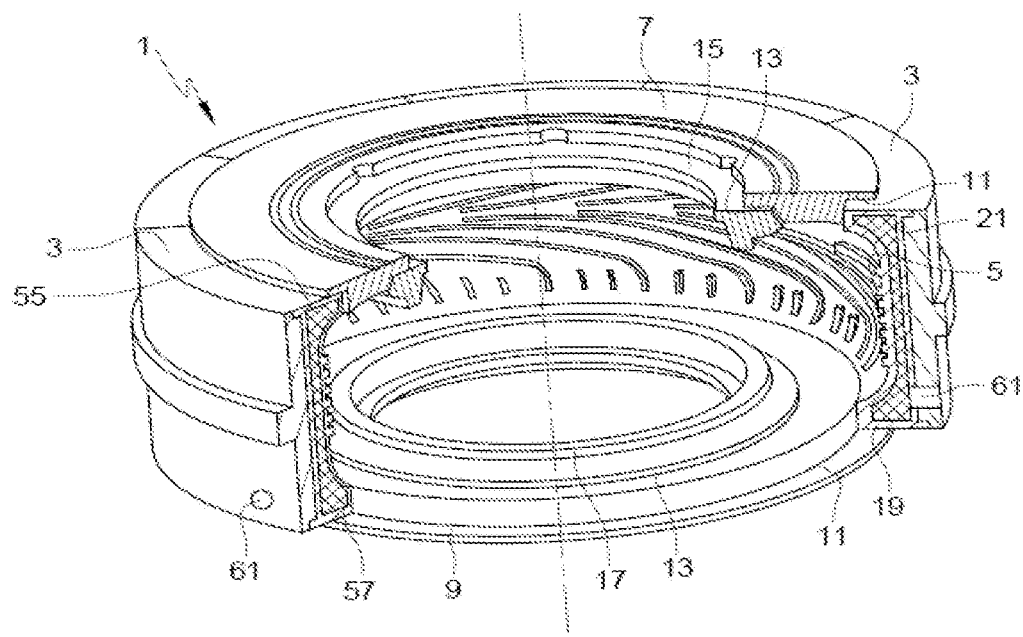
FIG. 1 is a partial cutaway view of a segmented mold assembly showing only the segments, sidewall plates and mold bead rings.

Reference is made to FIG. 1 that illustrates a first embodiment of a mold assembly 1. The mold assembly 1 comprises a plurality of mold segments 3 which are arranged to form an annular ring when assembled together. The outer tread surface of a tire is formed by the inner molding surface 5 of the mold segments 3 which corresponds to the external surface first wall of the tread molding element of the disclosure. The inner molding surface 5 has a plurality of sipes and blades to mold the tread pattern in a green tire. The mold segments 3 may be radially movable to allow assembly and disassembly of the tire mold about a green tire.

The mold assembly 1 further comprises a first and second sidewall plate (7, 9) for molding the sidewalls of the tire (not shown). Each sidewall plate (7, 9) joins with the mold segments 3 to form a smooth continuous surface from the tire tread to the sidewall. Each sidewall plate (7, 9) may comprise an optional radially outer lip 11 forming an L shaped recess for receiving a first and second flanged end of the mold segment therein. Each sidewall plate (7, 9) further comprises an optional radially inner extension or lip forming a second L shaped recess 13 for receiving a mold bead ring (15, 17) therein. Each bead ring (15, 17) has a radiused portion for receiving a bead area of a green tire thereon. The upper and lower sidewall plate (7, 9) together with the plurality of tread segments 3 and the top and bottom bead rings (15, 17) cooperate to define a mold cavity for molding a green tire.

The mold segment can comprise a tread molding element and a support element or comprises a tread molding element integral with the support element or comprises a tread molding element integral with the support element and with a slide block.

The mold segment can be formed from one or two elements; in the embodiment of FIG. 1 the mold segments are formed from a tread molding element 19 and a support element 21. However, in the embodiment of FIG. 2, the tread molding element and the support element are integral and form a single element being the mold segment 23.

Figure 2:
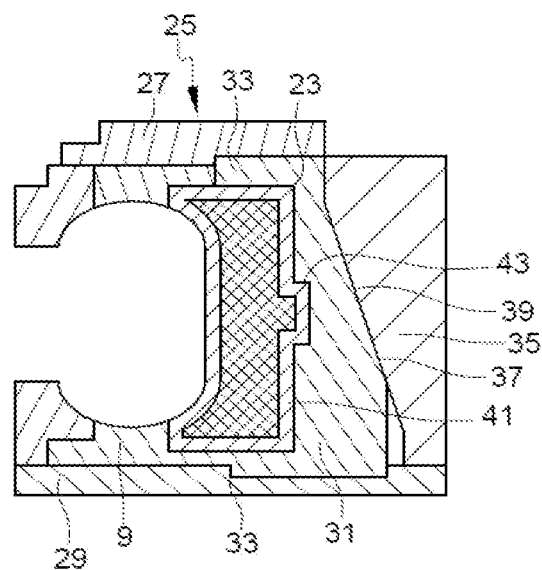
FIG. 2 is a partial cross-sectional view of a mold showing an example where the tread molding element and the support element are integral and form a mold segment according to the disclosure.

FIG. 2 is a partial cross-sectional view of a tire mold according to an embodiment of the invention wherein the mold segment is formed in one piece; i.e., wherein the tread molding element is integral with the support element.

The mold segment (3, 23) can be formed from one or two elements; the tire mold assembly may be housed in a container housing 25. The container housing 25 typically includes a top and bottom container plate (27, 29). The bottom container plate 29 has an inner annulus for supporting the sidewall plate 9 and bead ring 17. Surrounding the segments 23 are a plurality of slide blocks 31. Slide blocks 31 have flanged ends 33 for receiving and supporting the segments 23 therein. The slide blocks 31 have a top and a bottom surface for contacting the container plates (27, 29) and optional wear plates (not shown). Slide blocks 31 are slidable in a radial direction. The container housing 25 further comprises an annular actuating ring 35. The inner radial surface 37 of the actuating ring 35 is angled for engagement with an outer angled surface 39 of slide blocks 31. As the actuating ring 35 is lowered, the inner surface 37 of the actuating ring 35 engages the outer angled surface 39 of slide blocks 31, causing the slide blocks to slide radially inward. The camming action of the actuating ring 35 moves the slide blocks 31 radially inward. As the slide blocks 31 move radially inward, the radially inner surface 41 of the slide block 31 engages the outer surface 43 of the adjacent mold segment 23, moving the mold segment 23 radially inward as the actuating ring 35 is lowered into position.

Figure 3:
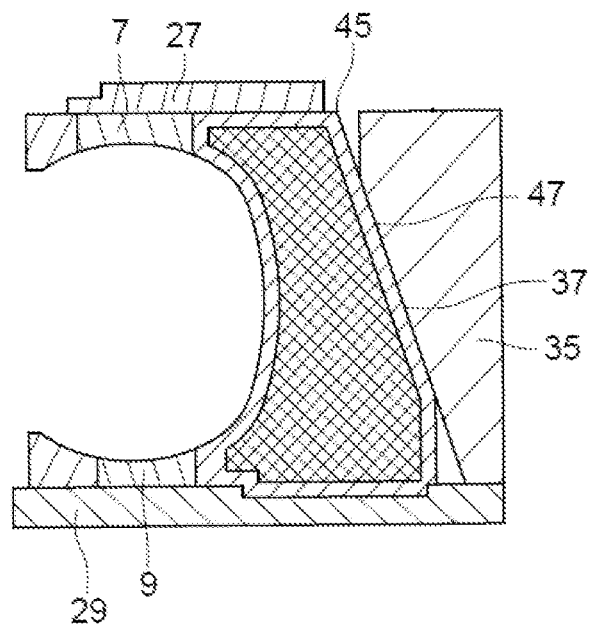
FIG. 3 is a partial cross-sectional view of a mold showing an example where the tread molding element, the support element and the side block are integral.

FIG. 3 is a partial cross-sectional view of a tire mold according to an embodiment wherein the mold segment and the slide blocks are integral so that the mold segment 45 has an outer radial surface 47 that is angled; in other words, the tread molding element, the support element and the slide block are integral. As a consequence, as the actuating ring 35 is lowered, the inner surface 37 of the actuating ring 35 directly engages the outer surface 47 of the mold segment 45, causing the mold segment 45 to slide radially inward. This embodiment allows the increase of the size of the tire produced in a tire mold of a defined size.

Figure 4:
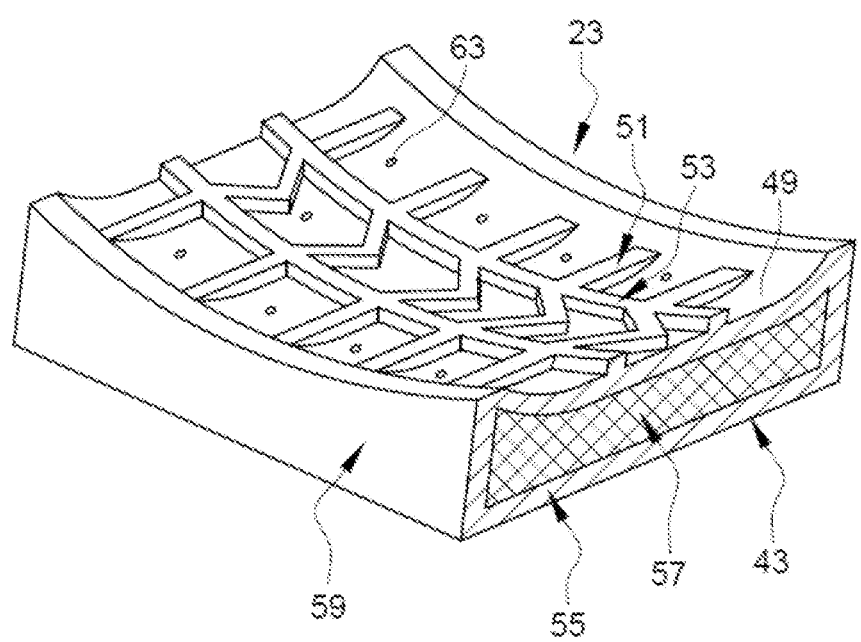
FIG. 4 represents the mold segment of FIG. 2.

Reference is now made to FIG. 4 that represents the mold segment 23 of FIG. 2, namely as a single element formed by the tread molding element and the support element. Each mold segment 23 comprises a body with a first wall 49 (i.e., an inner wall) that is equipped with a plurality of blades and/or sipes (not shown) for molding the tread pattern. The blades 51 extend from the external surface of the first wall 49 into the tire mold. They have one end attached to the first wall 49 (i.e., the proximal end) and one free end (i.e., the distal end). Blades may have any direction depending on the tread pattern that is desired. For example, the mold segments 23 may comprise one or more longitudinal ribs 53 to mold circumferential grooves, one or more longitudinal blades to mold circumferential sipes, one or more lateral ribs 51 to mold transversal grooves and one or more lateral blades to mold transversal sipes on a tread surface of the green tire. The transversal grooves or sipes are the ones extending in directions intersecting circumferential grooves and sipes provided on the tread surface. The transversal grooves or sipes are not necessarily perpendicular to the circumferential grooves or sipes, that is, they may extend in directions inclined to the circumferential grooves or sipes. Also, the transversal sipes have a width smaller than the width of the transversal grooves so that the lateral blades are thinner than the lateral ribs.

In an embodiment, the mold segment (3, 23, 45) is produced by an additive manufacturing process. 3D printing, also known as additive manufacturing, is the process by which a product is built layer by layer using raw material rather than taking material away from a larger stock.

The mold segment (3, 23, 45) of the disclosure comprises a tread molding element for the manufacture of a tire wherein the tread molding element comprises a shell 55 and an infill 57, wherein the shell 55 forms a first wall 49 with a negative tread pattern extending from its external surface for molding the tread and a second wall 59 opposed to the first wall, two lateral walls 59 and optionally one or two transverse edge walls; wherein the infill 57 is a fluid-permeable structure defining a fluid-permeable infill.

The mold segment (3, 23, 45) comprises two transverse edges wherein one or both of the transverse edges is devoid of a transverse edge wall or has a transverse edge wall (i.e. transverse edge wall without any opening to the infill) or has a transverse edge wall with one or more openings. Thus, the shell may comprise a first wall, a second wall opposed to the first wall, two lateral walls joining the first and the second wall and be devoid of transverse edge walls, or the shell may comprise a first wall, a second wall opposed to the first wall, two lateral wall joining the first and the second wall and one or two transverse edge walls.

According to the disclosure (and as illustrated on FIG. 1) at least one selected from a lateral wall or the second wall comprises at least one fluid passage 61 selected from an inlet port, an outlet port and any combination thereof, wherein the at least one fluid passage 61 is passing through the lateral wall or the second wall and is opened to the fluid permeable infill 57.

The tread molding element of the mold segment (3, 23, 45) has two distinct zones, i.e., a shell and an internal part (also named infill). The shell forms the outer walls of the tread molding element in which both the layers in contact with the printing base and the top layers that attribute the final surface finish are included. For example, the tread molding element comprises a shell and an infill wherein the shell includes a first wall and one or more ribs or one or more blades that are arranged to protrude from the first wall of the tread molding element to form a reverse imprint of a tread pattern. The reverse imprint can be used in a process for manufacturing a tire or a section of a tire to cut the surface of a green tire, or of a section of the green tire, according to the desired tread pattern.

The mold segment is produced by additive manufacturing (i.e., 3D printing) to allow the infill to be integral with the shell. The amount of material that occupies the internal part of the shell is called the infill percentage. Said infill percentage can be adjusted from a suitable program that will drive the 3D printer. Suitable programs such as rolling programs are known by the person skilled in the art and are commercially available.

It is preferred that the shell be as thin as possible, depending on the material used, the thickness of the shell is ranging from 0.3 mm to 15.0 mm, for example, from 1.0 mm to 12.0 mm; for example, from 2.0 mm to 10.0 mm; for example, from 3.0 mm to 8.0 mm.

In one embodiment wherein the shell is thin enough, at least one blade and/or at least one rib is hollow and open on the internal surface of the first wall of the mold segment. This configuration allows the heating fluid and/or the cooling fluid to come as close as possible to the surface of the tire. A spacer can be present to guarantee the rigidity of the blade while keeping a fluid-permeable aspect.

According to the disclosure, the infill is a fluid-permeable structure. The mold segment comprises a shell delimiting an interior volume and a fluid-permeable infill internal to the shell (and optionally a non-sintered part as it will be seen later). The shell is solid and the infill has a mesh structure having a plurality of cavities or a bionic structure. In the present disclosure, wherein the infill has a mesh structure having a plurality of cavities, at least a part of the cavities are connected to each other to form a fluid-permeable infill.

The fluid-permeable infill may have an infill pattern of any shape such as rectangular, triangular, hexagonal, or tri-hexagonal (i.e., hexagons interspersed with triangles). It is preferred that the shape of the infill pattern is hexagonal to offer to the tread molding element a great resistance in all directions. In FIG. 4, the infill pattern is hexagonal. A bionic structure is also preferred for mechanical reasons. In an embodiment, the bionic structure can be anchored on the internal surface of the inter wall at the basis of the blades and/or ribs in order to enhance the mechanical support of said blades and/or ribs.

In order to have the heating fluid and/or cooling fluid circulate within the mold segment, the infill percentage should be kept as low as possible. A suitable compromise is to be found with mechanical properties. For example, the fluid-permeable infill percentage is ranging from 10 to 80 vol. % based on the total volume of the internal cavity of the mold segment; for example, from 20 to 70 vol. % or from 30 to 60 vol. % or from 15 to 50 vol. % or from 25 to 40 vol. %.

According to the disclosure, the tread molding element comprises a shell and an infill, wherein the shell has a first wall with a negative tread pattern extending from its external surface for molding the tread and an second wall opposed to the first wall, two lateral walls and optionally one or two transverse edge walls; wherein the infill is a fluid-permeable structure defining a fluid-permeable infill; and wherein at least one selected from a lateral wall or the second wall comprises at least one fluid passage selected from an inlet port, an outlet port and any combination thereof, wherein the at least one fluid passage 61 is passing through the lateral wall or the second wall and is opened to the fluid permeable infill.

In an embodiment, at least two mold segments are put in fluid communication with each other, forming a fluid manifold. The fluid manifold has an inlet port and an outlet port (not shown). Steam or another fluid medium may be circulated at the desired temperature to heat or cool the mold segments. In an embodiment, an inlet port and/or an outlet port is present and is connecting the exterior of the mold segment to the fluid permeable infill. The fluid connection of two or more mold segments can be done by several ways.

For example, each mold segment comprises one inlet port and one outlet port. In an embodiment, at least two mold segments of a tire mold, such as at least two adjacent mold segments are in fluid connection by means of a flexible connector (not shown) that is connecting the outlet port of a first mold segment to the inlet port of the next mold segment so that the heating or cooling fluid exiting a mold segment is reintroduced in the next mold segment.

In case the mold segment is separated from the slide block, the connector has a first and second end that are received in bores of the slide block. The first end of the connector is connected to the outlet port of a first segment channel and the second end of the connector connects to the inlet port of an adjacent, second segment channel. Preferably the connector comprises a flexible tubing which is more preferably insulated. The flexible tubing is sized to have a sufficient length to allow the segments to move apart. Stainless steel braided tubing is one example which may be utilized. The container housing has slots aligned to receive the connectors therein so that the tubing is not bent when closing the tire mold.

Alternatively, one mold segment contains one inlet port and another mold segment contains the outlet port and one or more mold segments are in fluid connection by means of their transverse edges. When the mold segment comprises two transverse edges, at least a portion of one or both of the transverse edges is devoid of a wall to form a fluid passage intended for the fluid connection of the infill of said mold segment with the infill of another mold segment which is placed adjacent in a tire mold being in a closed configuration. In other words, the shell is perforated on the transverse edges to create a fluid passage between two adjacent mold segments. For example, the mold segment comprises two transverse edges with transverse edge walls and one or both of the transverse edge walls have one or more openings to form a fluid passage intended for the fluid connection of the infill of said mold segment with the infill of another mold segment which is placed adjacently in a tire mold being in a closed configuration. For example, the mold segment comprises two transverse edges and is devoid of at least one transverse edge wall, preferably the mold segment comprises two transverse edges and is devoid of transverse edge walls. In such a configuration the transverse edge is open to the infill to form a fluid passage intended for the fluid connection of the infill of said mold segment with the infill of another mold segment which is placed adjacently in a tire mold being in a closed configuration.

The mold segment of the disclosure reduces the thermal energy required during tire vulcanization by reducing the cycle time from warm-up and cool-down cycle. The invention provides this benefit by providing the heat source inside the tread molding elements of the mold segments. As a result of bringing the heat source nearest to the tire, the slide blocks (when present) can be made of cheaper materials such as ceramic or plastic instead of steel as there is no need for thermal conductivity between the actuating ring and the slide blocks.

In an embodiment, the first wall has a porous structure and/or the first wall has one or more vents 63 forming one or more fluid passages and which are selected from microholes, micro venting channels, slots and any combination thereof.

When one or more vents are present, they can be formed by additive manufacturing or can be achieved by using a liquid-jet laser process as described in U.S. Pat. No. 8,859,988 which is hereby incorporated by reference in its entirety. Similar to a mechanical milling process, the liquid-jet laser passes over the tread surface multiple times and removes material with each pass. This process is repeated until there is a fluid connection between the tread surface and the fluid permeable infill.

When one or more slots are present, they can be oriented in a nearly parallel direction to the sipes (lamellas) or other features inside the tread block. Such orientation can be useful to connect an area as large as a possible in the tread block to the fluid permeable infill. Such near parallel connection slot allows easy implementation in complex treads such as is the case for winter tires. In such cases the sipe density is high and the sipe spacing is narrow.

For example, the one or more vents have a width ranging from 10 µm to 500 µm; preferably from 15 µm to 100 µm; and more preferably from 20 µm to 50 µm.

When multiple mold segments are assembled to form a complete tire mold, which includes a complete circumferential mold for making a tire, the complete tire mold is open, e.g., the mold segments are placed apart from each other. A green tire can be placed in the open tire mold. The green tire can be a tire without the tire tread, e.g., a tire that is formed by mechanically assembling layers of rubber materials around reinforced meshes. The tire mold can then be closed, e.g., the tire mold segments are pushed against each other to form a complete circumferential mold around the green tire. The air in the tire mold will be evacuated during the expansion of the green tire to the mold tread surface, which will push the air to the one or more vents, e.g., the vents that are connected to the fluid-permeable infill.

In some embodiments, to assist in the evacuation of the air in the tire mold, in a beginning stage, the fluid permeable infill can be coupled to a vacuum assembly, for example, through a valve connected to a dedicated outlet port. The valve can be closed after a period of time. The pressure in the fluid permeable infill can be sub-atmospheric, such as below 0.9 or below 0.5 atmospheric pressure.

In some embodiments, the vacuum assembly can stop after an initial time, e.g., the valve connecting to the fluid permeable infill can be closed after the initial time. Alternatively, the vacuum assembly does not start at all, or the valve is always closed. The evacuation of the air inside the tire mold can occur only due to the pushing of the green tire toward the tread pattern of the tire mold. Since the fluid permeable infill is isolated from the outside ambient, the pressure in the fluid permeable infill can increase during the expansion of the green tire. The more the green tire approaches the tread pattern, the more the air will be evacuated to the fluid permeable infill, and the higher the pressure in the fluid permeable infill becomes. The pressure in the fluid permeable infill can exert a counterpressure to the green tire, thus can limit the entrance of rubber and rubber debris into the one or more vents.

After the air is evacuated, the heating fluid is introduced in the mold segment. The heating fluid such as steam can be provided under pressure. For example, the pressure of the heating fluid can be higher than atmospheric pressure, such as between 8 and 25 bar, or between 10 and 20 bar; or between 13 and 19 bar.

The mold segment is preferably produced by additive manufacturing. The process for manufacturing the mold segment comprising a tread molding element configured to mold at least a portion of a tire tread, comprises the steps of:

modeling a three-dimensional shape of a tread molding element through a modeling program;

providing a printing material selected from one or more metallic materials or one or more plastic compositions comprising one or more thermoplastic polymers having a melting point of at least 180° C. determined according to ISO 3146:2000;

forming a tread molding element by additive manufacturing from the printing material based on the modelled three-dimensional shape of the tread molding element wherein the tread molding element comprises a shell and an infill, wherein the shell has a first wall with a negative tread pattern extending from its external surface for molding the tread and an second wall opposed to the first wall, two lateral walls and optionally one or two transverse edge walls;

wherein the step of modeling a three-dimensional shape of a tread molding element through a modeling program includes creating a digital model representing a three-dimensional shape of an infill being a fluid-permeable structure; and wherein the process further comprises a step of creating one or more fluid passages on one or more walls forming the shell, wherein the one or more fluid passages are selected from an inlet port and an outlet port and are opened on the fluid-permeable infill.

In an embodiment, the step of modeling a three-dimensional shape of a tread molding element through a modeling program that can be recognized by a 3D printer includes creating a digital model representing a three-dimensional shape of a tread molding element. For example, the three-dimensional shape of a tread molding element defines at least partially a molding cavity for forming a corresponding tire tread pattern. The molding member has a cavity with a reverse imprint of a tread pattern.

In an embodiment, the step of modeling a three-dimensional shape of a tread molding element through a modeling program that can be recognized by a 3D printer includes creating a digital model representing a three-dimensional shape of an infill being a fluid-permeable structure.

In an embodiment, the step of modeling a three-dimensional shape of a tread molding element through a modeling program that can be recognized by a 3D printer includes creating a digital model representing a three-dimensional shape of a molding cavity wherein the molding cavity has a first wall with a porous structure. It is understood that the porous structure allows fluid such as air to be evacuated into the fluid-permeable infill during the closing of the mold.

In an embodiment, the step of modeling a three-dimensional shape of a tread molding element through a modeling program that can be recognized by a 3D printer includes creating a digital model representing a three-dimensional shape of one or more vents on the inner radial wall selected from micro-holes, micro venting channels, slots and any combination thereof; wherein the one or more vents are connecting the fluid permeable infill.

In an embodiment, the step of modeling a three-dimensional shape of a tread molding element through a modeling program that can be recognized by a 3D printer includes creating a digital model representing a three-dimensional shape of one or more fluid passages on the second wall; wherein at least one fluid passage is selected from an inlet port and an outlet port open on the fluid-permeable infill.

For example, the digital model is created from the modeling program. In performing this step, it is understood that a digital model is created to represent a three-dimensional structure comprising a molding member for use in molding a physical tire or a section of a tire.

The modeling program is a three-dimensional modeling program. Such programs are known to the person skilled in the art and are commercially available. Examples of suitable modeling program include but are not limited to AutoCAD, 3D Max, SolidWorks, CATIA, SketchUp, Maya, Inventor, and Pro Engineer. For example, the modeling program is CATIA. The terms "CATIA" and "Computer Aided Three-Dimensional Interactive Application" as used herein refer to program forming a multi-platform CAD/CAM/CAE commercial software suite. It was developed by Dassault Systèmes (Vélizy-Villacoublay, France), and is commercially available from sources known by those having ordinary skill in the art, such as IBM Corporation (Armonk, N.Y)

The three-dimensional modeling program is used to model the three-dimensional shape of the object, convert it to an STL file (i.e. "Standard Triangle Language" file).

The mold segment can be made from a material selected from one or more metallic materials or one or more plastic compositions comprising one or more thermoplastic polymers having a melting point of at least 180° C. as determined according to ISO 3146.

In the embodiments wherein the mold segment is made from a material selected from one or more metallic materials, the metallic material is preferably selected from aluminum or stainless steel. It is preferred that the one or more metallic materials are provided in the form of powders so that the process of additive manufacturing is selected from Fused Deposition Modeling (FDM), Selective Laser Sintering (SLS), Selective Laser Melting (SLM) or Electron Beam Melting (EBM); with preference, the process is Selective Laser Melting (SLM).

These additive manufacturing processes are well known to the person skilled in the art. For example, the document EP1641580 describes a Selective Laser Melting (SLM) process wherein a first layer of metal powder is spread on a tray. All or part of the grains of this first layer of powder are then agglomerated by the beam of a laser according to the shape of the object that one wishes to obtain. Once this step is performed a second layer of powder is spread on the first layer of powder to be in turn selectively fused by laser. By repeating the layer spreading and laser melting operations, a sintered object is built layer by layer.

The tread molding element of the mold segment can comprise only a sintered part (i.e. can be a fully sintered element) or can comprise a sintered part and a non-sintered part attached to this sintered part. Processes to produce elements comprising both a sintered part and a non-sintered part are known to the person skilled in the art and are described in several documents such as in DE102004028462 and U.S. Pat. No. 9,409,233. In the embodiments wherein the tread molding element comprises a non-sintered part, the said non-sintered part is preferably the second wall. The outer wall is forming a base. The sintered part of the tread molding element is manufactured from a metallic powder deposited on the surface of the non-sintered base, wherein the metallic powder is fused layer by layer, and wherein the sintered part is attached to the non-sintered base by fused metallic powder. The non-sintered base can be flat or can have a curved shape. The non-sintered base can be machined at least on one side. In an embodiment, the tread molding element comprises a sintered part and a non-sintered part attached to this sintered part, wherein the non-sintered part is the second wall and is drilled to form at least one fluid passage selected from an inlet port, an outlet port and any combination thereof, wherein the at least one fluid passage is passing through the second wall and is opened to the fluid permeable infill.

More particularly, the sintered part is produced by additive manufacturing such as by laser sintering from a metallic powder which is fused layer by layer using laser means. The non-sintered part is a solid component that strengthens the sintered part. To ensure a good junction between the parts of the mold segment, the non-sintered part (i.e., the base) is made of a material compatible with the metallic powder used to manufacture the sintered part. This material is selected from aluminum and stainless steel and is preferably stainless steel.

The tread molding element of the mold segment is a sintered element or comprises a sintered part; wherein the sintered element or the sintered part comprises at least one rib or blade produced by additive manufacturing of a metallic material. Thus, the negative tread pattern comprises reliefs selected from one or more sipes, one or more blades and any combination thereof wherein the one or more reliefs are integral with the first wall.

The method for producing a tread molding element comprising a sintered part and a non-sintered part attached to this sintered part may be as follows. A first layer of metallic powder is spread over a base being a non-sintered part. The base may have a parallelepipedal overall shape comprising a flat surface over which the powder is spread. The base rests on a bed belonging to the manufacturing machine. In this first step, all or some of the particles of the first layer are agglomerated by laser means according to the targeted shape. These laser means may comprise a laser capable of generating a laser beam to fuse the powder and a computer controlling the laser. The computer contains the digital model that was created from the modeling program. By repeating these operations of spreading a layer and fusing it using a laser, a powder assembly is obtained, that comprises fused powder forming the fluid permeable infill and the shell and non-fused powder that partially or fully covers this fused powder.

In a further step, the non-fused powder is removed to keep the sintered part (i.e. the infill and the shell) clear. For example, the base is drilled or pierced using drilling or piercing means to form at least one passage allowing the removal of the non-fused powder. The at least one passage becoming, later on, a fluid passage selected from an inlet port, an outlet port and any combination thereof.

Optionally, the base is machined to provide a specific shape of the radial outer wall. The base can be machined in such a way that the non-sintered part completely extends the sintered part. The mold segment thus has unity of shape.

In particular, it is possible to use a more complex meshed structure for the core of the molding element. For example, it is possible to add a network of beams between the partitions of the infill to strengthen the structure of this infill.

The infill can be attached directly to the base. As an alternative, the shell continues between the infill and the base. The shell therefore completely encloses the infill.

The one or more fluid passages selected from an inlet port, an outlet port and any combination thereof will allow the heating and/or the cooling of the fluid to come as close as possible to the first wall and therefore to the tread of the tire.

It is preferred that the shell be as thin as possible so that a compromise is found between the mechanical properties that need to be shown by the mold segment and the heat transmission. For example, the shell is formed only of fully fused metallic powder and has a thickness ranging from 0.3 mm to 15.0 mm; for example, from 0.5 mm to 12 mm; for example, from 0.8 mm to 10 mm; for example, from 1.0 mm to 8.0 mm; for example, from 1.5 mm to 6.0 mm; for example, from 1.8 mm to 5.0 mm; for example, from 2.0 mm to 4.0 mm; for example, from 2.2 mm to 3.5 mm. The shell is thus rigid enough to be used in a tire vulcanizing mold. The use of a mold segment with a thin shell improves the thermal conductivity of the molding element, and this improves the degree to which the green tire is heated during the vulcanizing operation.

The infill internal to the shell has a fluid-permeable structure. The infill comprises a lattice structure comprising a plurality of partitions delimiting cavities or has a bionic structure or a bionic structure that is formed by a lattice structure. The bionic structure is preferably an arched form inspired by an animal's spinal column, or a tree form structure. The bionic structure is creating a more stiff and rigid structure than a mere lattice. For example, the fluid-permeable structure is selected from a bionic structure or a bionic structure that is formed by a lattice structure wherein the bionic structure comprises one or more arched parts, one or more tree-form parts and any mixture thereof.

In the embodiment wherein the infill has a lattice structure (which can be bionic or not), the partitions are formed of powder that has been agglomerated by laser fusing. In an embodiment, a part of the cavities contains non-fused powder. The presence of this non-fused powder further improves the thermal conductivity of the molding element. In a preferred embodiment, the cavities are devoid of non-fused powder.

The partitions are dimensioned such that the infill is sufficiently able to withstand the mechanical stresses associated with molding the tire. By way of example, the thickness of the partitions is between 0.1 mm and 0.5 mm; for example, from 0.2 mm to 0.4 mm.

Examples of suitable metallic materials are stainless steel and Nickel based AM powder commercially available under the denomination Ancor AM 17-4-PH; Ancor AM 316L; Ancor AM1.2709; Ancor AM IN626 and Ancor AM IN718; or any similar material.

In an embodiment wherein the mold segment is made of one or more metallic materials, the first wall is a porous structure. The first wall has a multiplicity of pores with a pore size ranging from 0.1 µm to 20.0 µm; preferably from 0.5 µm to 15.0 µm; more preferably from 1.0 µm to 10.0 µm; even more preferably from 1.5 µm to 8.0 µm and most preferably from 2.0 to 5.0 µm. Metallic porous materials manufactured by additive manufacturing technology are known to persons skilled in the art and are described for example in Bioactive Materials 4 (2019) 56-70 (the teachings of which are incorporated herein by reference).

In the embodiments wherein the mold segment is made from a material selected from one or more plastic compositions comprising one or more thermoplastic polymers having a melting point of at least 180° C. determined according to ISO 3146, the one or more plastic compositions can take many forms; however, it is preferred that the one or more plastic compositions are provided in the form of one or more filaments so that the process is performed using a filament-based 3D printer such as a Fused Filament Fabrication (FFF) printer. FFF printers involve spools of filament fed through a heated extruder and deposited in layers on a print bed which is a flat surface. When ready to begin printing, the filament is unwound from a coil through an extrusion nozzle. The material is then heated until molten and laid down on the print bed by the extruder, in a shape controlled via computer and 3D modeling software. As the material exits the extruder nozzle, it fuses to itself and hardens. This process is repeated, building the product up layer by layer until the tread molding element has been fully realized.

Filament-based 3D printers, such as FFF printers, are known to the person skilled in the art and commercially available. The FFF printers comprise an extruder and a hotend. The extruder is driving the filament through the 3D printing system and is responsible for controlling the material feed into the hotend. The extruder typically comprises a stepper motor that activates gears, which in turn grip the filament and push it through the hotend and onto the print bed. The hotend is the component of a 3D printer that melts the filament for extrusion and helps to maintain a consistent and accurate temperature for successful prints. The hotend is responsible for melting and depositing material. The hotend typically comprises a guiding tube for the filament, a heating element, and a brass nozzle. The extruder will drive the filament through the hotend where it will be heated until molten and then further extruded through the nozzle and onto the print bed. Once heated, the nozzle also serves to decrease the filament diameter from the initial 1.75 mm or 3.00 mm to a diameter that may range from 0.2 mm to 0.4 mm, depending on the nozzle. For example, the initial filament diameter is 1.75 mm.

According to the disclosure, the tread molding element is formed by 3D printing from a plastic composition comprising one or more thermoplastic polymers selected from one or more polyamides, one or more polyether ether ketones and one or more polyetherimides.

For example, the one or more thermoplastic polymers are selected to have a melting point of at least 190° C. as determined according to ISO 3146:2000; preferably of at least 205° C., more preferably of at least 220° C., even more preferably of at least 230° C. or at least 240° C. Thus, the one or more polyamides are selected to have a melting point of at least 190° C.; preferably of at least 205° C., more preferably of at least 220° C., even more preferably of at least 230° C. or at least 240° C.

With preference, the one or more thermoplastic polymers are selected to have a melting point of at most 400° C.; preferably of at most 380° C.

For example, the one or more thermoplastic polymers are or comprise one or more polyether ether ketones. The polyether ether ketone (PEEK) has a melting point of about 343° C. The melting point is determined according to ISO 3146:2000.

For example, the one or more thermoplastic polymers are or comprise one or more polyetherimides (CAS 61128-46-9). The polyetherimide (PEI) has a melting point ranging from 340° C. to 360° C. The melting point is determined according to ISO 3146:2000. Non-limiting example suitable PEI filaments that can be used in the context of the disclosure are commercially available under the denomination of ULTEM™ FILAMENT.

For example, the one or more thermoplastic polymers are or comprise one or more polyamides wherein the one or more polyamides are selected from Nylon-6; Nylon-6,6; Nylon-6,9; Nylon-6,10; Nylon-6,12; Nylon-11; Nylon-4,6 and Nylon-66/6 copolymer. With preference, the one or more polyamides are or comprise Nylon-66/6 copolymer.

Nylon-6 (also known as polycaprolactam or as poly (azepan-2-one) or as poly(hexano-6-lactam)) has a melting point of about 225° C. Nylon-6,6 (also known as hexamethylene adipamide) has a melting point of about 265° C. Nylon-6,9 (also known as hexamethylene azelamide) has a melting point of about 208° C. Nylon-6,10 (also known as hexamethylene sebacamide) has a melting point of about 227° C. Nylon-6,12 (also known as hexamethylene dodecane-diamide) has a melting point of about 218° C. Nylon-11 (also known as ω-undecanamide) has a melting point of about 189° C. Nylon-4,6 (also known as tetramethylene adipamide) has a melting point of 290° C. Nylon-66/6 copolymer (i.e. a copolyamide made from PA 6 and PA 66) has a melting point of about 243° C. The melting point is determined according to ISO 3146:2000.

For example, the thermoplastic polymer filament has a tensile strength (X-Y orientation in a dry state) ranging from 30.0 MPa to 300.0 MPa as determined according to ISO 527; preferably ranging from 40.0 MPa to 200.0 MPa; more preferably ranging from 50.0 MPa to 100.0 MPa. The dry state means that the specimens are annealed at 80° C. for 30 min and dried 48 hours before testing.

For example, the thermoplastic polymer filament has an elongation at break (X-Y orientation in a dry state) ranging from 5.0% to 60.0% as determined according to ISO 527; preferably ranging from 7.0% to 50.0%; more preferably ranging from 8.5% to 20.0%. The dry state means that the specimens are annealed at 80° C. for 30 minutes and dried 48 hours before testing.

For example, the thermoplastic polymer filament has a Charpy impact strength at 23° C. (X-Y orientation in a dry state) ranging from 3.0 to 40.0 kJ/m$^2$ as determined according to ISO 179; preferably, ranging from 5.0 to 35.0 kJ/m$^2$; more preferably ranging from 7.0 to 30.0 kJ/m$^2$. Non-limiting examples of suitable nylon filaments that can be used in the context of the disclosure are commercially available under the denomination PolyMide™ CoPA which has a tensile strength (X-Y orientation in a dry state) of 66.2+/−0.9 MPa as determined according to ISO 527; elongation at break (X-Y orientation in a dry state) of 9.9+/−1.5%; Charpy impact strength at 23° C. (X-Y orientation in a dry state) of 9.6+/−1.4 kJ/m$^2$. In an embodiment, at least one plastic composition is a composite comprising the one or more thermoplastic polymers and one or more reinforcing materials such as one or more selected from carbon fibers and glass fibers; with preference, carbon fibers. Non-limiting examples of suitable reinforced nylon filaments that can be used in the context of the disclosure are commercially available under the denomination nylon carbonite. Non-limiting examples of suitable reinforced PEEK filaments that can be used in the context of the disclosure are commercially available under the denomination of CarbonX™ CF-PEEK. When reinforced filaments are used, the person skilled in the art will have an advantage to use a nozzle that is resistant to abrasive material. An example of such nozzles is commercially available under the commercial denomination Olsson Ruby.

For example, the step of forming a tread molding element by 3D printing from the one or more plastic compositions includes building the tread molding element from a plurality of layers made from the deposition of a plastic composition wherein the tread molding element is divided into at least two sections, each of the at least two sections being made of different plastic compositions.

For example, the step of forming a tread molding element by 3D printing from the one or more plastic compositions includes forming at least one rib or blade by 3D printing from the one or more plastic compositions.

For example, the shell is formed by one or more plastic compositions and has a thickness ranging from 2.0 to 15.0 mm; for example, ranging from 3.0 mm to 12.0 mm; for example, ranging from 4.0 mm to 10.0 mm; for example, ranging from 5.0 mm to 8.0 mm.

FIG. 4 illustrates a mold segment according to the disclosure formed by the tread molding element integral with the support element. The tread molding element comprises a body and at least one rib or blade and the one or more plastic compositions used to form the body can be the same or different from the one or more plastic compositions used to form at least one rib or blade. For example, both the body and at least one rib or blade are formed from the same plastic composition. For example, the body comprises a shell and an infill, and the shell and at least one rib or blade are formed from the same plastic composition whereas the infill is formed from a different plastic composition. For example, the entire tread molding element is formed from a single plastic composition.

For example, the tread molding element comprises a body and at least one rib or blade, and the body is formed from a plastic composition different from the one or more plastic compositions used to form at least one rib or blade. For example, one or more plastic compositions used to form at least one rib or blade are a composite comprising the one or more thermoplastic polymers and one or more reinforcing materials such as one or more of carbon fibers and glass fibers; with preference, carbon fibers.

For example, the tread molding element comprises a shell and an infill and the shell is made of a plastic composition different from the one or more plastic compositions used to make the infill. For example, one or more plastic compositions used to form the shell are a composite comprising the one or more thermoplastic polymers and one or more reinforcing materials such as one or more selected from carbon fibers and glass fibers; with preference carbon fibers.

In an embodiment, one or more plastic compositions used to form the infill are a composite comprising the one or more thermoplastic polymers and one or more reinforcing materials such as one or more selected from carbon fibers and glass fibers; with preference, carbon fibers.

Nylon is hygroscopic and therefore may absorb moisture from the air. Moisture in a nylon filament may turn to steam as it enters the nozzle of the printer, and can cause gaps in the flow or create back-pressure or swelling of the filament, increasing the risk of jamming. Therefore, the person skilled in the art would have the advantage to keep the relative humidity or moisture below 15%. To this effect, a step of drying the one or more plastic compositions can be performed before forming a tread molding element by 3D printing from the one or more plastic compositions. The drying step can be performed using a filament dryer. For example, the drying step is performed by airflow at a temperature ranging from 35° C. to 70° C. The filament can be kept dry via the use of a dry box, for example.

The print surface is preferably cleaned before use, for example using acetone or isopropyl alcohol to remove all grease and residue from the print bed.

It is preferable to heat the print bed of the 3D printer to reduce shrinking and separation of the tread molding element from the print bed. For example, the print bed temperature is ranging from 40° C. to 80° C., preferably from 50° C. to 75° C., more preferably from 60° C. to 70° C., or from 60° C. to 80° C.

It is preferable to use an adhesive to bond the tread molding element to the print bed. A suitable adhesive that can be used in the context of the disclosure is a Nano Polymer Adhesive, such as the one commercially available from Vision Miner.

The extrusion temperature of the one or more plastic compositions (i.e. of the filament of plastic composition) is selected to promote the adhesion of the first layer. For example, the extrusion temperature is at least 230° C.; for example, at least 240° C.; for example, at least 250° C.; for example, at least 260° C. The extrusion temperature is at most 400° C.; for example, at most 350° C. For example, the extrusion temperature is ranging from 250° C. to 300° C. Increasing the print temperature can improve the adhesion of the first layer. However, when the extrusion temperature is too high, the filament will continue to melt and leak from the nozzle causing threads and burrs. To the contrary, when the extrusion temperature is set too low, this may cause gaps or separation between the layers. Suitable hotends that can be used for extrusion temperatures of up to 400° C. are commercially available under the commercial name Dragon All Metal Hotend.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A mold segment comprising a tread molding element for manufacturing a tire, wherein the tread molding element comprises a shell and an infill, the shell having i) a first wall with a negative tread pattern extending from its external surface for molding the tread, ii) a second wall opposed to the first wall, and iii) lateral walls; wherein the infill is a fluid-permeable structure defining a fluid-permeable infill; wherein at least one selected from a lateral wall and the second wall comprises at least one fluid passage passing through the lateral wall or the second wall and is fluidly connected to the fluid permeable infill; wherein the fluid-permeable structure is selected from a fluid-permeable lattice structure, a bionic structure, and a bionic structure which is formed by a lattice structure; and wherein the negative tread pattern of the first wall comprises one or more of sipes and blades which are integral with the first wall and at least one blade is hollow and open to an internal surface of the first wall.

2. The mold segment of claim 1, wherein the mold segment is produced by an additive manufacturing process and is made of a material selected from one or more of i) metallic materials and ii) one or more plastic compositions comprising one or more thermoplastic polymers having a melting point of at least 180° C., as determined according to ISO 3146.

3. The mold segment of claim 2, wherein the material is at least one metallic material selected from aluminum and stainless steel.

4. The mold segment of claim 3, wherein the tread molding element is either a fully sintered element or comprises a sintered part and a non-sintered part attached to the sintered part, wherein the non-sintered part is the second wall.

5. The mold segment of claim 3, wherein the first wall is a porous structure.

6. The mold segment of claim 1, wherein the first wall has a thickness ranging from 1.0 mm to 15.0 mm.

7. The mold segment of claim 1, wherein the first wall has one or more vents.

8. The mold segment of claim 7, wherein the one or more vents pass through the first wall and are open to the infill or to a fluid conduit formed into the infill.

9. The mold segment of claim 1, wherein the mold segment comprises one of:
   a tread molding element and a support element;
   a tread molding element integral with a support element; and
   a tread molding element, a support element and a slide block, wherein the tread molding element is integral with the support element and the slide block so that the second wall of the mold segment has an outer angled surface.

10. The mold segment of claim 1, wherein the mold segment further comprises one of:
    two transverse edges with transverse edge walls wherein one or both of the transverse edge walls have one or more openings to form a fluid passage intended for a fluid connection of the infill of said mold segment with the infill of another mold segment placed adjacently in a tire mold being in a closed configuration; or
    two transverse edges and is devoid of transverse edge walls.

11. A segmented tire mold divided in a tire circumferential direction into a plurality of mold segments, each mold segment having a first and a second transverse edge and being movable in a respective operation direction between i) an open position in which the mold segments are spaced from each other and ii) a closed position in which two neighboring mold segments are in contact with each other by one of their transverse edges, and wherein the tire mold comprises at least one mold segment according to claim 1.

12. The segmented tire mold of claim 11, wherein at least two mold segments comprising a fluid-permeable infill are in fluid communication with each other.

13. The segmented tire mold of claim 12, wherein each mold segment comprising a fluid-permeable infill comprises at least one inlet port and at least one outlet port; and at least two mold segments are in fluid communication by means of a flexible connector that is connecting an outlet port of one mold segment to an inlet port of the other mold segment.

14. The segmented tire mold of claim 12, wherein at least two neighboring mold segments comprising a fluid-permeable infill either have one or more openings on their transverse edge wall, wherein the one or more openings are arranged to form a fluid passage through their transverse edge when the mold segments are in the closed position; or are devoid of at least one transverse edge wall to form a fluid passage through their transverse edge when the mold segments are in the closed position.

15. The segmented tire mold of claim 11, further comprising an actuating ring with an inner surface, wherein at least one mold segment comprising a fluid-permeable infill has a second wall with an outer angled surface, and wherein the inner surface of the actuating ring engages the outer angled surface of the mold segment, and is configured to move the mold segment from its open position to its closed position upon movement of the actuating ring.

16. A mold segment comprising a tread molding element for the manufacture of a tire wherein the tread molding element comprises a shell and an infill, and wherein the shell has a first wall with a negative tread pattern extending from its external surface for molding the tread, a second wall opposed to the first wall, and lateral walls;
- wherein the infill is a fluid-permeable structure defining a fluid permeable infill; wherein the shell is integral with the fluid-permeable infill;
- wherein the first wall comprises one or more vents which pass through the first wall and are open to the fluid permeable infill;
- and wherein at least one selected from a lateral wall and the second wall comprises at least one fluid passage which passes through the lateral wall or the second wall and is open to the fluid permeable infill; wherein the one or more vents have a width ranging from 10 µm to 500 µm.

* * * * *